United States Patent [19]
Hastings et al.

[11] 3,808,597
[45] Apr. 30, 1974

[54] ISO-PHASE POSITION DETERMINING SYSTEM

[75] Inventors: Charles E. Hastings, Newport News; William A. Rounion, Tabb, both of Va.

[73] Assignee: Teledyne, Inc., Los Angeles, Calif.

[22] Filed: May 11, 1970

[21] Appl. No.: 36,371

Related U.S. Application Data

[63] Continuation of Ser. No. 713,202, March 14, 1968, abandoned.

[52] U.S. Cl. ..... 343/105 R, 343/105 H, 343/105 LS
[51] Int. Cl. ............................................... G01s 1/30
[58] Field of Search ....... 343/105 R, 105 H, 105 LS

[56] References Cited
UNITED STATES PATENTS

| | | | |
|---|---|---|---|
| 3,016,533 | 1/1962 | Frank | 343/112 C |
| 2,148,267 | 2/1939 | Honore | 343/105 LS |
| 2,724,114 | 11/1955 | Kaufman | 343/105 R |
| 2,974,318 | 3/1961 | Koeppel | 343/105 H |

*Primary Examiner*—Maynard R. Wilbur
*Assistant Examiner*—S. C. Buczinski
*Attorney, Agent, or Firm*—Ronald W. Reagin

[57] ABSTRACT

The following specification discloses an iso-phase position determining system for locating the position of a mobile receiver with respect to three transmitters. The center transmitter frequency is slaved to the other two transmitters such that its frequency is equal to $F_1 + N/M \Delta f$ wherein $N$ and $M$ are integers, $F_1$ is the frequency of one of the other two transmitters and $\Delta f$ is the difference in frequency between the other two transmitters. The mobile receiver is equipped with apparatus to phase compare the various signals from the transmitters in such a manner as to locate the position of the mobile receiver with respect to a family of iso-phase contours defined by the relationship $$K_1, K_2 \ldots K_n = C + M B/N + A M/N - 1)$$

wherein $A, B$ and $C$ represent the distance from the three transmitters to the mobile receiver. The system is also equipped to determine the position of the mobile receiver with respect to a family of hyperbolas having as their foci the two uncontrolled transmitters.

10 Claims, 7 Drawing Figures

INVENTORS
CHARLES E. HASTINGS
WILLIAM A. ROUNION
BY Cushman, Darby Cushman
ATTORNEYS

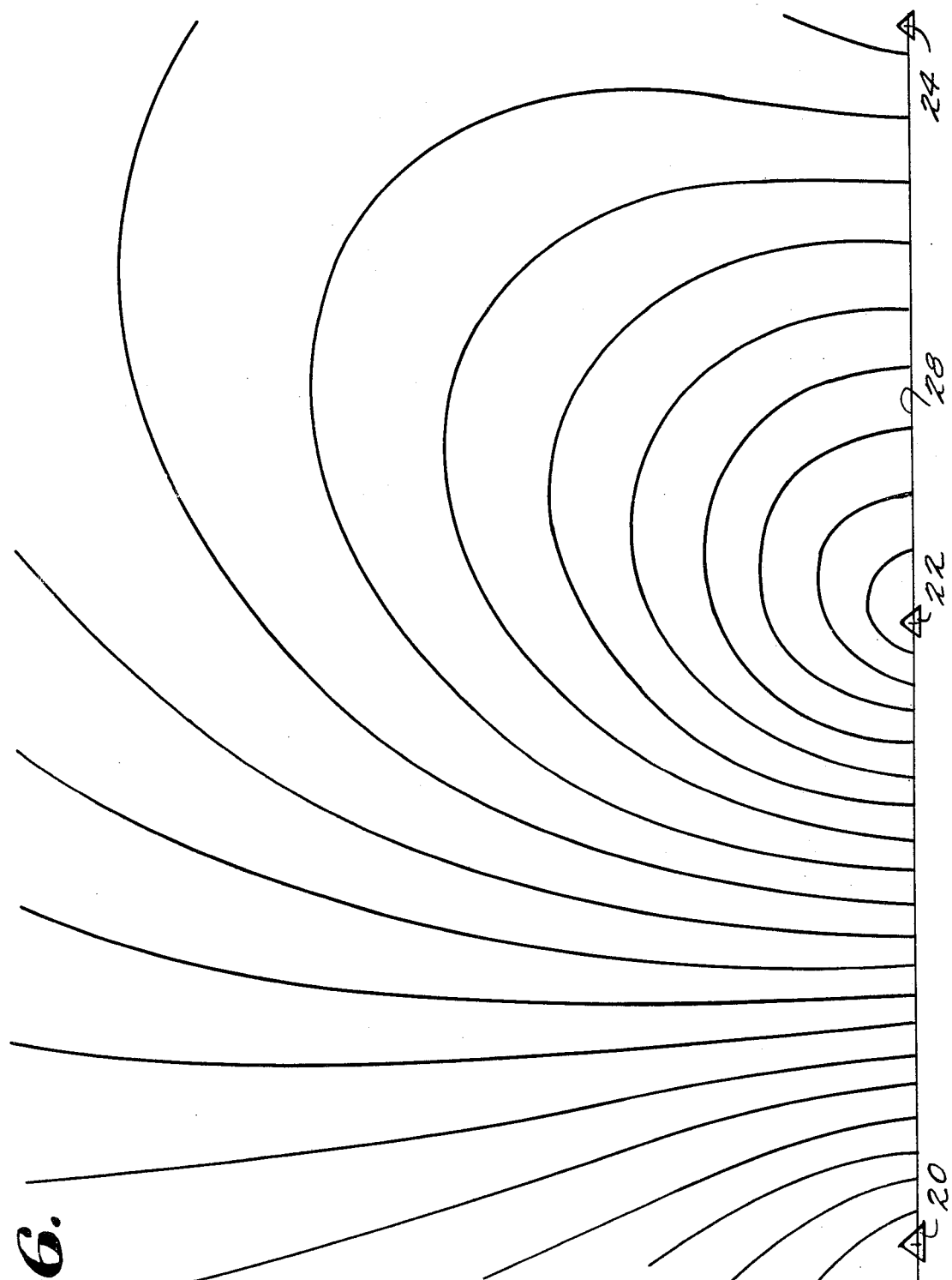

ISO-PHASE POSITION DETERMINING SYSTEM

BACKGROUND OF THE INVENTION

This is a continuation of our U.S. Pat. application Ser. No. 713,202 filed Mar. 14, 1968, now abandoned.

The present invention relates to radio navigation equipment and more particularly to an improved non-saturable, iso-phase navigational system.

In conventional hyperbolic iso-phase navigation systems, two pairs of fixed, spaced transmitters, one transmitter normally being common to both pairs, are employed to transmit distinct radio frequency signals. By properly arranging the various transmitters, an overlapping or intersecting pattern of two families of iso-phase lines of position can be obtained. These iso-phase lines of position of contours represent the locus of points whereat the phase difference between the signals from respective pairs of the transmitters is zero and are in the shape of hyperbolas, having as their foci, the stationary transmitters.

A mobile craft, the position of which is to be determined, is generally equipped with receiving apparatus for phase comparing the signals from the respective pairs of fixed transmitters, whereby two intersecting lines of position can be determined which thus enables a navigational fix of the craft's position with respect to the transmitters to be obtained.

In the known hyperbolic systems, due to the nature of the hyperbola, the angles of intersection of the iso-phase contours generated by two pairs of transmitters become quite acute in a substantial portion of the region covered and become severely acute in the region of maximum range. This renders the position determination in such regions relatively inaccurate as compared to the accuracy which can be achieved in regions where the intersections approach 90°.

In order to produce an overlapping pattern of iso-phase lines and to achieve a greater intersection angle, the center station of a three transmitter hyperbolic system must be displaced from the line interconnecting the two outer stations. When such systems are employed to determine the position of an ocean going vessel, for example, the displacement of the center station in this manner normally requires that it be located a substantial distance inland from the shoreline. Displacement of the center station in this manner not only results in a decreased range proportional to the degree of displacement, but also introduces a noise factor, as well as undesirable phase shift problems, due to the fact that the signal from the center station must travel over land for a substantial distance.

BRIEF DESCRIPTION OF THE INVENTION

The present invention suggests an improved iso-phase position determining system wherein the iso-phase contours of two overlapping systems intersect at approximately 90° angles throughout the major portion of the area in which the mobile craft is to be navigated and wherein all of the transmitters may be arranged in a straight line without degrading the performance of the system. In addition, the improved system of the present invention also provides certain lane identification capabilities which are not possible in the prior known systems.

Briefly, and in accordance with a preferred embodiment of the present invention, three fixed, spaced transmitters are employed and the phase and frequency of the signal from one of the transmitters is maintained in a determined relationship to the phase and frequency of the other two transmitters. The independent transmitters are operated at frequencies $F_1$ and $F_1 + \Delta f$, respectively, where $F_1$ is preferably in the RF range and $\Delta f$ is an audio difference frequency. Other frequency ranges, however, may, of course, be used. The controlled transmitter is operated at a frequency $F_1 + (N/M) \Delta f$, where $N$ and $M$ are integers.

The mobile craft is equipped with receiver apparatus for deriving a first signal having a phase proportional to the phase difference between signals, as received, from the controlled transmitter and the independent transmitter operating at $F_1$, and a second signal, or current, having the same frequency as the first signal and a phase proportional to the phase difference between the signals, as received, from the two independent transmitters. These two signals are then phase compared to enable the mobile craft to determine its position with respect to a family of iso-phase contours defined by the general relationship $K_1, K_2 \ldots K_n = C - (M/N) B + A (M/N) - 1)$ where $K_1, K_2 \ldots K_n$ are constants respectively associated with the $n$ members of the family of contours and $A$, $B$, and $C$ represent the distance from any point on said contours to one of the independent transmitters, the controlled transmitter and the other independent transmitter respectively. The constants $K_1, K_2 \ldots K_n$ are determined by the system characteristics, i.e., the frequencies transmitted, the spacing between the transmitters, etc., and are of values such that the iso-phase contours are the locus of points whereat the phase difference between the first and second signals derived in the mobile receiver is zero.

The shape of these iso-phase contours is such that they intersect the iso-phase contours of a single hyperbolic system generated between the two independent transmitters at substantially 90° throughout a major portion of the region covered. These hyperbolic contours are defined by the general relationship $K_1', K_2' \ldots K_n' = A-C$ where $K_1', K_2' \ldots K_n'$ are constants respectively associated with respective members of the family of contours and $A$ and $C$ represent the distance from any point thereon to the two independent transmitters respectively. In accordance with a preferred embodiment of the present invention, the receiver-transmitter apparatus is also equipped to determine position with respect to such a hyperbolic system to thereby yield two lines of position and thus a navigational fix with respect to the transmitters.

The iso-phase contours produced by the phase comparison method of the present invention not only yield 90° intersections with the hyperbolic system but also form a closed pattern of contours. This characteristic enables a mobile craft coming into the system at a substantial distance from the transmitters, to determine the starting point of the system and thus obtain lane identification. Other techniques are required to establish lane identification in the hyperbolic system.

BRIEF DESCRIPTION OF THE DRAWINGS

The present invention may be better understood by referring to the following detailed description along with the accompanying drawings in which:

FIG. 6 illustrates the iso-phase contours generated by an alternate embodiment of the present invention.

DETAILED DESCRIPTION OF THE DRAWINGS

Figure 1:
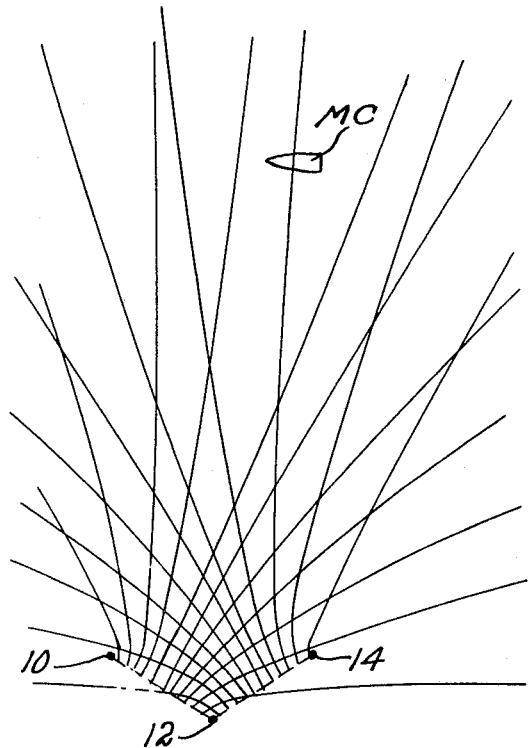
FIG. 1 illustrates the conventional iso-phase contours of a dual hyperbolic navigation system.

In FIG. 1 there is shown the iso-phase contours of a conventional, prior art, dual, hyperbolic, iso-phase radio navigation system. The three fixed transmitting stations 10, 12 and 14 are generally operated at separate and distinct radio frequencies in order to enable adequate separation of the signals in the receiving apparatus located on the mobile craft, MC, which is to be navigated in the area covered by the iso-phase lines of the two hyperbolic systems.

As can be seen in FIG. 1, there is a substantial area in which the iso-phase lines generated between transmitters 10 and 12 intersect the iso-phase lines generated between stations 12 and 14 at an acute angle. It is characteristic of such systems that as the angle approaches 0° from a value of 90°, the accuracy of resolution decreases. There exists therefore, in the system shown in FIG. 1, a substantial area in which position resolution becomes difficult due to the acute intersection angles.

It is a further characteristic of such prior art systems, that the center or common transmitter must be off-set from the imaginary line passing through the end stations in order to produce an angle $\theta$ less than 180° which is necessary to cause the hyperbolic contours of each system to intersect or overlap, and to yield as many 90° intersections as possible.

In coastal navigation applications wherein a relatively straight shoreline exists, the center station must be displaced a substantial distance inland in order to have the proper angle $\theta$. As previously explained, this causes undesirable noise and phase shift problems in the signal from the center station due to the transmission thereof over land.

Figure 2:
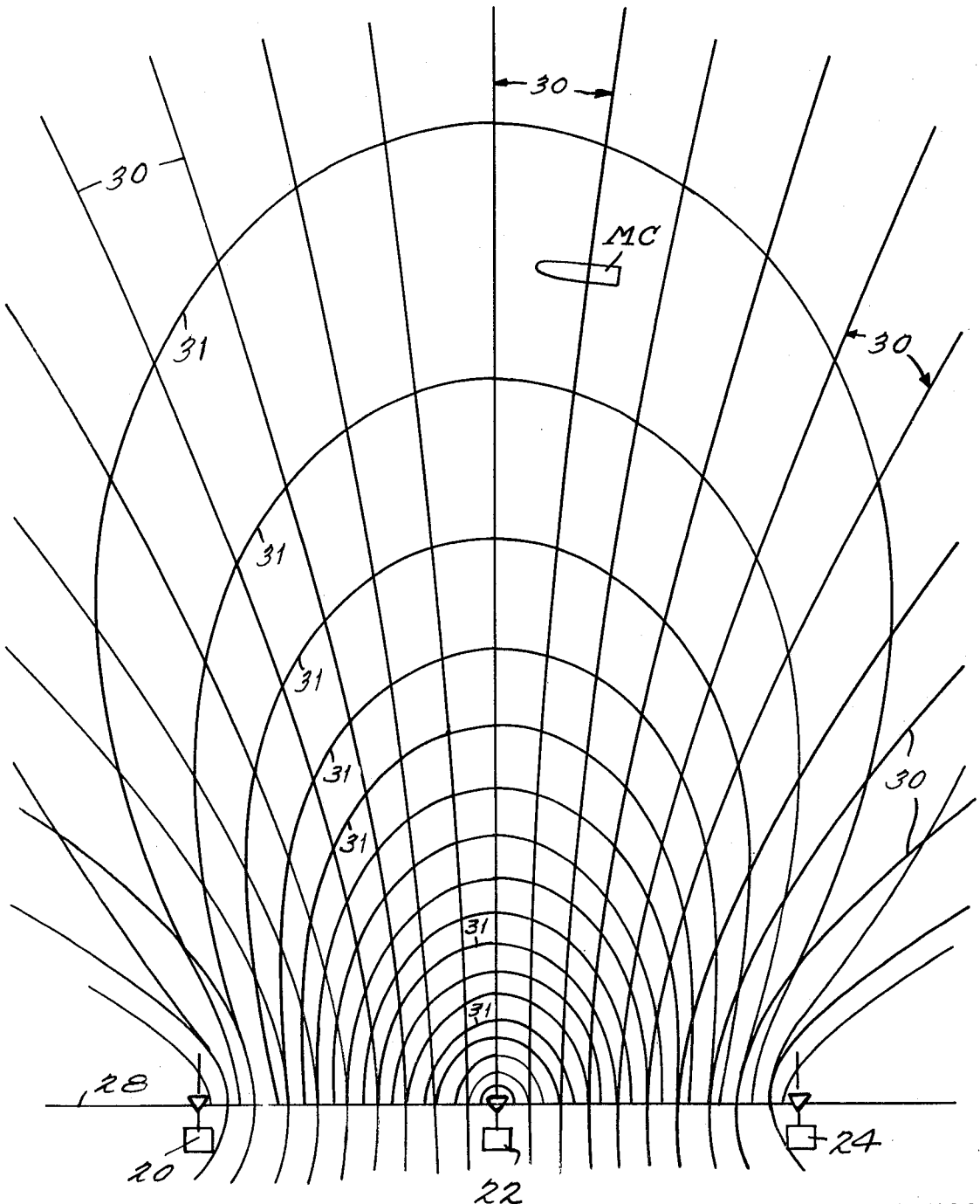
FIG. 2 illustrates the iso-phase contours generated by the present invention.

In accordance with the present invention, iso-phase contours are generated in the pattern as shown in FIG. 2, wherein three transmitting stations 20, 22 and 24 are employed and disposed in a straight line along the common axis 28. By phase comparing the signals from the two end stations 20 and 24, the hyperbolic iso-phase contours 30, having as their foci the transmitting stations 20 and 24, can be monitored. In order to have a fixed pattern it is, of course, necessary to either phase lock the two transmitters or transmit reference phase information.

Figure 3:
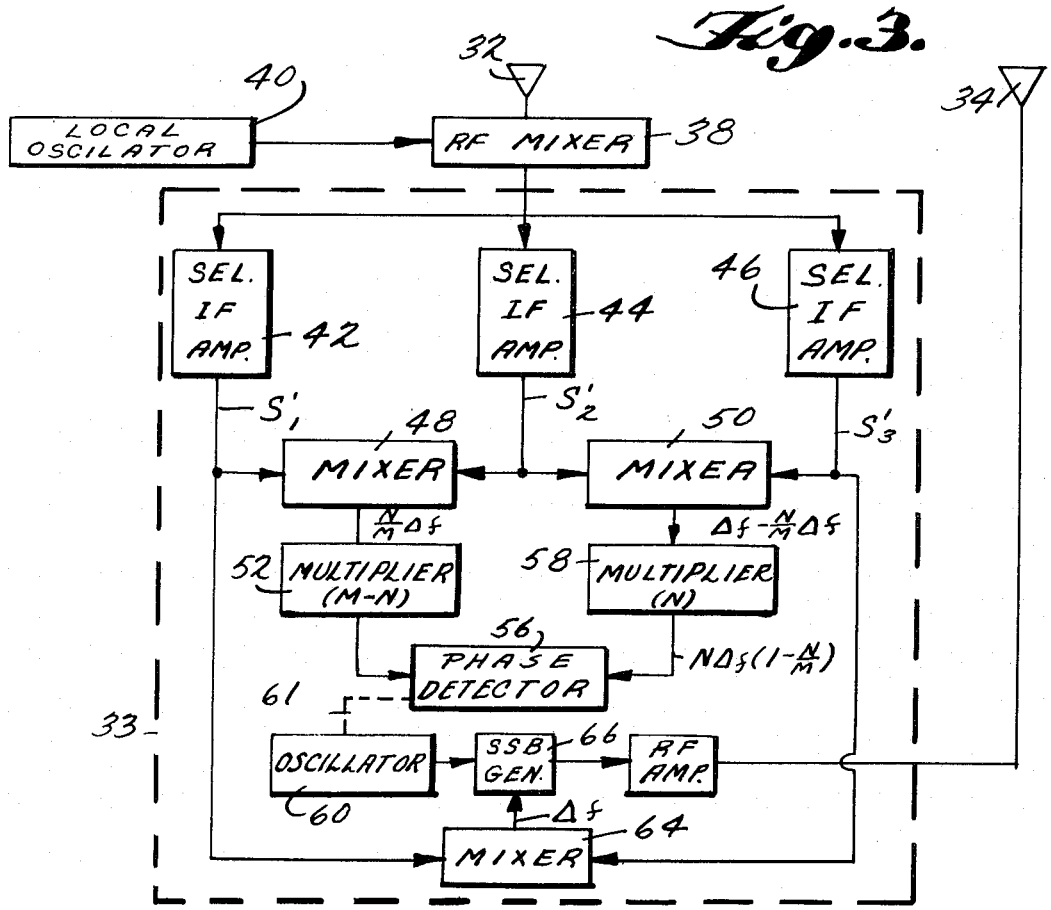
FIG. 3 is a schematic block diagram of the apparatus employed to control the frequency of the center transmitting station.
Figure 4:
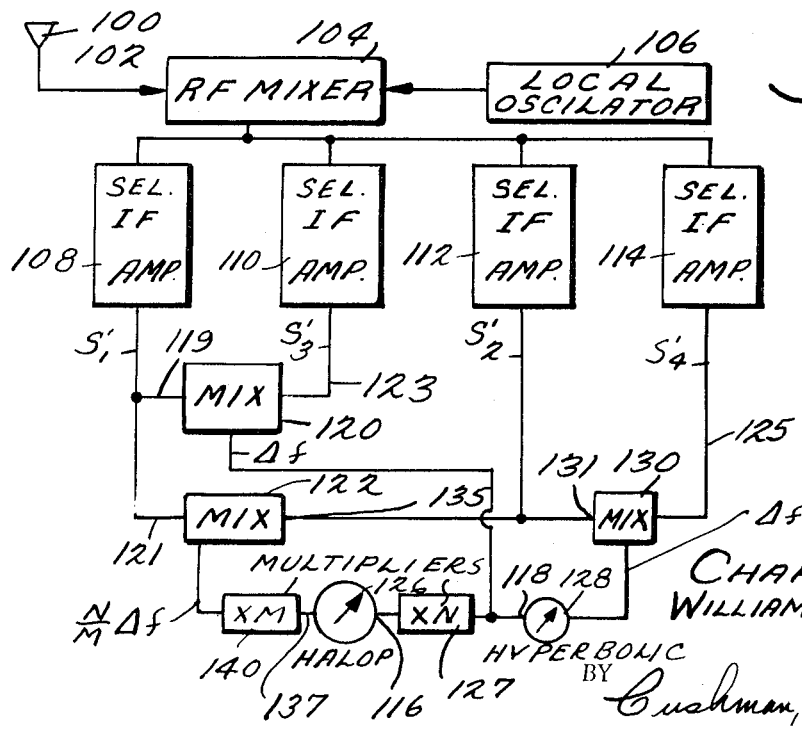
FIG. 4 is a schematic block diagram of the mobile receiver employed in accordance with the teachings of the present invention.

By employing transmitter-receiver apparatus in accordance with the teachings of the present invention, and as shown in greater detail in FIGS. 3 and 4, the iso-phase contours 42 can be generated, which can be seen to substantially increase the area and number of 90° intersections between the iso-phase contours. The contours 31, if continued to the lower portion of the drawing, would duplicate the curves as shown in FIG. 2 and thus could be described as being somewhat hourglass-shaped. For lack of technical terminology for such shapes, however, these curves will hereinafter be referred to as "halops." By comparing the intersecting contours as shown in FIGS. 1 and 2, it can be seen that the present invention provides a substantial improvement from the standpoint of intersection angles of the iso-phase lines and in addition, does not require the location of the center station inland from the line intersecting the two end stations, thus eliminating the possible signal degredation due to over-land transmission.

The transmitters 20 and 24 are preferably independently driven by stable crystal controlled oscillators, the details of which are well known to those skilled in the art. Other types of transmitters may, of course, be employed.

The center station 22 is shown in detail in FIG. 3 and includes the receiving antenna 32, a transmitting antenna 34 and the control means 33. The control means is employed to control both the phase and the frequency of the signal from the center station transmitter and also to generate an upper side band modulation on this signal to provide reference phase information.

In general, the end station 20 generates a radio frequency signal $S_1$ having a frequency $F_1$ and the other end station 24 generates a signal $S_3$ having a frequency of $F_1$ plus an audio difference frequency $\Delta f$ and having a phase independent of the phase of the signal $S_1$. Although an audio difference $\Delta f$ is preferred due to bandwith conservation considerations, it is to be understood the $\Delta f$ could be a frequency difference of any desired magnitude. The center station generates a fundamental frequency signal $S_2$ which is regulated by the control apparatus 33 such that the fundamental frequency has a value of $F_1 + (N/M) \Delta f$, wherein $N$ and $M$ are integers, and has a phase $\phi_2$ relative to the phases of $S_1$ and $S_3$ of the value $\phi_1 + (N/M) \Delta \phi$, wherein $\phi_1$ in the phase of $S_1$ and $\Delta \phi$ is the difference in the phases of $S_1$ and $S_3$, $\phi_3 - \phi_1$. The center station is also equipped to transmit a signal $S_4$ as an upper side band modulation on the fundamental frequency which is preferably greater than the fundamental frequency by a frequency equal to $\Delta f$.

The various signals, i.e., $S_1$ from station 20 which has a frequency $F_1$, $S_2$ from station 22 having frequency corresponding to $F_1 + (N/M) \Delta f$ and $S_3$ from station 26 which has a frequency $F_1 + \Delta f$, are received by antenna 32 and mixed in RF mixer 38 with the local oscillator signal from oscillator 40. The intermediate frequency signals $S_1'$, $S_2'$ and $S_3'$ are then fed to the three selective IF amplifiers 42, 44 and 46. Amplifiers 42, 44 and 46 are tuned to the frequencies of IF signals $S_1'$, $S_2'$ and $S_3'$, respectively. The signal $S_1'$ from amplifier 42 and $S_2'$ from amplifier 44 are mixed in mixer 48, the output of which is the beat frequency difference between $S_1$ and $S_2$, i.e., $N/M \Delta f$ and which has a phase of $\phi_2 - \phi_1$.

The signal $S_2'$ from amplifier 44 and $S_3'$ from amplifier 46 are mixed in mixer 50, the output of which is the beat frequency difference between $S_3'$ and $S_2'$, i.e., $\phi f - N/M \Delta f$, and has a phase of $\phi_3 - \phi_2$.

The beat frequency from mixer 48 is multiplied in frequency multiplier 52 by a factor of $(M-N)$ to produce a signal having a frequency $N \Delta f (1 - [N/M])$ and having a phase of $(M-N)(\phi_2-\phi_1)$ which is then fed to one input of the phase detector 56. The beat frequency signal from mixer 50 is multiplied in frequency multiplier 58 by the factor "N" to produce a signal having the frequency $N \Delta f(1-[N/M])$ and having the phase $N(\phi_3-\phi_2)$, which is then connected to the other input of phase detector 56. By virtue of the multipliers 52 and 58, the frequencies and phases of the signals connected to the inputs of the phase detector 56 are equal. assuming that the signals agree with the predetermined frequency and phase relationship, i.e., $S_1 = F_1$, $S_2 = F_1 + (N/M) \Delta 0 f$ and $S_3 = F_1 + \Delta f$, and $\phi_2 = \phi_1 = (N/M) \Delta \phi$. Therefore, assuming that the frequencies and phase of the signals from the stations 20, 22 and 24 are constant and of the above values, the phase detector 56 should have a zero output.

The variable phase and frequency oscillator 60 generates the signal $S_2$ and is controlled by a suitable feedback connection from the phase detector 56 as schematically indicated by dotted line 61. This feedback connection may be of any well known form such as mechanical gearing coupled to a mechanically variable element in the oscillator 60 or electrical feedback apparatus. Should the frequency and/or phase of any of the signals $S_1$, $S_2$ and $S_3$ vary from this predetermined relationship, the phase detector 56 will generate an output to change the phase and/or frequency of the output from oscillator 60 such that the signal $S_2$ is always at a frequency $F_1 = (N/M) \Delta f$ and bears a constant phase relationship with respect to the signals $S_1$ and $S_3$.

The control apparatus additionally includes a mixer 64 for deriving from the signals $S_1'$ and $S_3'$ a beat frequency signal having a frequency $\Delta f$ and a phase dependent upon the phase difference between $\phi_1$ and $\phi_3$ of signals $S_1$ and $S_3$ at the antenna 32. The frequency $\Delta f$ is modulated on the signal from oscillator 60 as an upper side band in the single side band modulator 66. The modulator 66 is effective in a well known manner to generate the upper side band while retaining the carrier or fundamental signal from the oscillator 60. The composite signal is then fed to the transmitting antennae 34 of station 22. In this manner, the signal transmitted from station 22 has a frequency of $F_1 + (N/M) \Delta f$ and an upper side band at a frequency of $(F_1 = [N/M] \Delta f) = \Delta f$, and having the phases described above. These frequencies correspond to the signals $S_2$ and $S_4$.

In FIG. 4 there is shown a preferred embodiment of the mobile receiving apparatus which processes the signals transmitted from the transmitters 20, 22 and 24 to derive the necessary information to determine the position of the craft with respect to the halop iso-phase contours and also the hyperbolic contours shown in FIG. 2. The mobile receiver is equipped with an antenna 100 which in turn, is connected via lead 102 to RF mixer 104 wherein the received signals, $S_1$, $S_2$, $S_3$ and $S_4$ are mixed with the local oscillator frequency from the oscillator 106 to reduce the frequencies of the received signals to corresponding intermediate frequency signals $S_1'$, $S_2'$, $S_3'$ and $S_4'$. A plurality of selective IF amplifiers 108, 110, 112 and 114 are provided to selectively amplify the signals $S_1'$, $S_3'$, $S_2'$ and $S_4'$, respectively. The signal $S_1'$ is fed from the IF amplifier 108 to input 119 of mixer 120 and input 121 of mixer 122. The signal $S_3'$ is fed from the selective IF amplifier 110 to the other input 123 of mixer 120. The mixer 120 is thereby effective to generate the audio difference frequency $\Delta f$ which has a phase proportional to the phase difference between the signals $S_1$ and $S_3$ as received at the mobile receiver which is in turn determined by the position of the craft with respect to the stations 20 and 24. This signal is connected to input 116 of phase detector 126 through frequency multiplier 127 and directly to input 118 of phase detector 128. The phase detectors 126 and 128 are preferable 360° phase meters but may, of course, take other and different forms. The frequency multiplier 127 is effective to multiply the frequency by the factor N.

Selective IF amplifier 114 amplifies the intermediate frequency signal $S_4'$ and this amplified signal is fed to input 125 of a third mixer 130. The selective amplifier 112 is effective to amplify the signals $S_2'$, which amplified signal is in turn connected to the other input 131 of mixer 130. Mixer 130 is thereby effective to generate an audio difference frequency $\Delta f$ having a phase which is dependent upon the phase of the signals $S_2$ and $S_4$ as transmitted from the center transmitter 22, but which is independent of the position of the mobile craft. The phase of this signal is dependent only upon the phase difference between the signals $S_1$ and $S_3$ as received by antenna 32 at station 22 which is determined by the phase of the signals $S_1$ and $S_3$ as transmitted and the distances from stations 20 and 24 to antenna 32. The output from mixer 130 therefore constitutes reference phase information.

The amplified signal $S_2'$ is also fed to the other input 135 of mixer 122. This mixer is thereby effective to generate an audio difference frequency equal to $(N/M) \Delta f$. The signal $(N/M) \Delta f$ from the mixer 122 is connected through a multiplier circuit 140 to the other input 137 of phase meter 126. Multiplier 140 is effective to increase the frequency of the signal from mixer 122 by a factor of $M$ whereby the output frequency of the multiplier which is connected to the phase meter 126 is of a frequency equal to $N \Delta f$. In this manner, both phase meters 126 and 128 are effective to phase compare signals of equal frequency.

By receiving the signals $S_1$, $S_2$, $S_3$ and $S_4$ in the manner hereinbefore described with respect to the receiving apparatus shown in FIG. 4, the phase meter 126 is effective to indicate phase information which, when the zero phase points are plotted on a chart having indices of known positions, including the transmitting stations 20, 22 and 24, result in the halop pattern of iso-phase lines as shown in FIG. 2.

The equation for halop curves shown in FIG. 2 can be derived by considering the inputs to the halop phase detector 126.

As previously indicated, the iso-phase contours are defined by the locus points whereat the phase detector 126 indicates zero phase difference between the signal inputs thereto. The signal at input 137 has a frequency $N \Delta f$ and a phase $\phi_5$ and the signal at input 116 has a frequency $N \Delta f$ and a phase $\phi_6$. Since the signal at input 137 is the beat frequency between signals $S_1$ and $S_2$, $\phi_5$ is the phase difference between these signals, multiplied by $M$, and is therefore proportional to the difference between the distances traveled by these signals, i.e., $M(B-A)$ where $A$ is the distance between the mobile receiver and station 20 and $B$ is the distance between the mobile craft and station 22. Thus $\phi_5 \approx M(B-A)$. Similarly $\phi_6 \approx n(C-a)$ where $C$ is the distance between the mobile craft and station 24.

Therefore, and since $\phi_5 - \phi_6$ must equal zero when craft is following a halop contour, the path of the craft when following a contour can be defined by $N(C - A) - M(B - A) = K$ where $K$ is a constant which reflects the fact that there are a plurality of contours defined by $\phi_5 - \phi_6 = 0$ and is dependent upon the frequencies of signals $S_1$, $S_2$ and $S_3$ and the phase relationship of the signals as transmitted. The family of contours can therefore be defined by $C - (MB/N) + A([M/N] - 1) = K_1, K_2 \ldots K_n$ where $K_1, K_2 \ldots K_n$ are the constants associated with the respective members of the family and, for a given system, are equal to the values of the expression on the left side of the equation for points of zero phase difference, i.e., $\phi_5 = \phi_6$, along the base line passing through the three transmitting stations.

The halop contours shown in FIG. 2 are symmetrical with respect to the center station 22. These contours represent the iso-phase lines of position generated by the transmitter-receiver apparatus shown in FIGS. 3 and 4 for the specific conditions of $M = 2$ and $N = 1$ and wherein the station 22 is located midway between the stations 20 and 24. Under these specific conditions, the multipliers 52 and 58 are unity multipliers and thus comprise a direct connection of the signals from mixers 48 and 50 to the phase detector 56. In the receiver apparatus of FIG. 4, the multiplication factor of multiplier 127 is also unity and therefore constitutes a direct connection and the multiplication factor of multiplier 140 is 2.

Under these specific conditions, it can be seen from FIG. 2 that the halop contours substantially symmetrically overlap the hyperbolic contours and produce substantially 90° intersections therewith.

In addition to the improvement resulting from the 90° intersection angles, the present invention also enables a mobile craft to obtain lane identification in the halop system under certain circumstances. In the present system, there are only a finite number of halop patterns. This number is a function of the spacing of the stations in terms of wavelength of the frequencies used. Due to the closed nature of the halop patterns, as opposed to the open and infinitely extending hyperbolas, a craft coming into the system, along one of the hyperbolas for example, would observe the halop phase meter slowly approach zero. When the meter reads zero, the operator knows that the craft is located on the last, or furthest out, halop contour. By then keeping accurate lane count the position in the halop system will always be known. This lane identification capability is completely absent from the hyperbolic systems wherein the iso-phase contours are open-ended and infinitely extending.

The phase meter 128, in accordance with well known principals, is effective to indicate position relative to the hyperbolic iso-phase lines as shown in FIG. 2. This can be easily verified by considering the inputs to this phase meter. One input of the phase meter 128 constitutes a signal having a frequency equal to the frequency difference between the signals $S_1$ and $S_3$ transmitted from the end stations 20 and 24 and has a phase which is proportional to the phase difference between the signals $S_1$ and and $S_3$ transmitted from the end stations 20 and 24 and has a phase which is proportional to the phase difference between the signals $S_1$ and $S_3$ as received at the mobile receiver. This phase difference is proportional to the difference in distance traveled by signals $S_1$ and $S_3$, i.e., A and C, respectively. By comparing the phase of this signal with a reference phase shift which is dependent upon the phase of the frequencies transmitted from the center station, which is in turn related to the phase and frequency of signals as transmitted from the end stations, but independent of the position of the mobile craft, phase shifts and phase drift in the signals $S_1$ and $S_3$ are cancelled and the hyperbolic iso-phase meter 128 is rendered effective to indicate the phase differences between the signals $S_1$ and $S_3$ resulting solely from the difference in distance between stations 20 and 24 and the mobile receiver. This phase meter is therefore effective to indicate the position of the ship with respect to the hyperbolic iso-phase contours shown in FIG. 2 which are defined by the general relationship $K_1', K_2', \ldots K_n' = C-A$ where $K_1', K_2' \ldots K_n'$ are unique constants associated with respective ones of the family of hyperbolas. Thus it can be seen that the apparatus shown in FIGS. 3 and 4 is effective to render two position indications, one with respect to the halop iso-phase contours of FIG. 2 and the other with respect to the hyperbolic iso-phase contours also shown in FIG. 2 and therefore presents sufficient information from which a navigational fix of the mobile craft with respect to the transmitting stations can be obtained.

Figure 7:
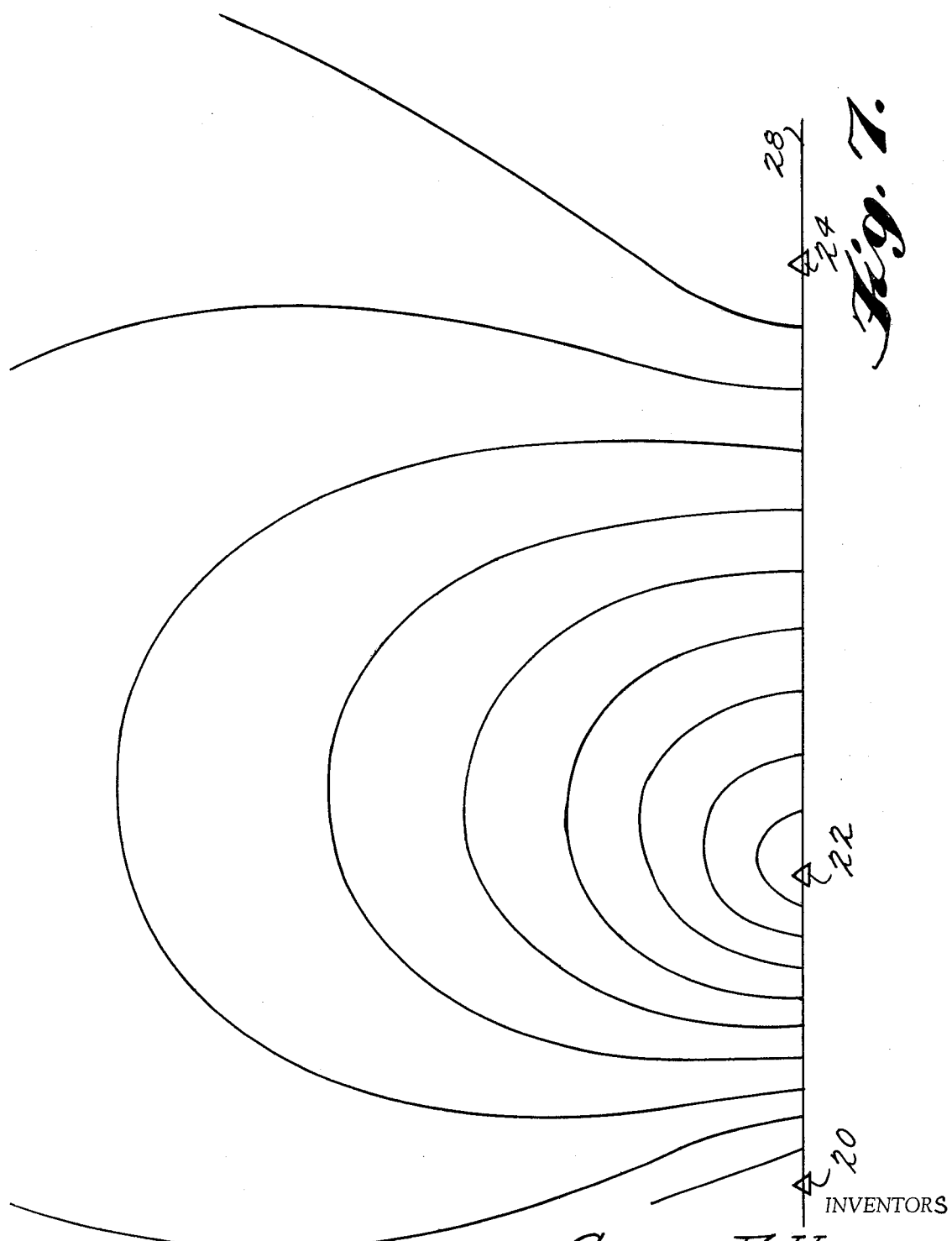
FIG. 7 illustrates yet another pattern of iso-phase contours generated by the apparatus of the present invention.

Although the halop contours shown in FIG. 2 are symmetrical with respect to station 22 for the conditions $M = 2$ and $N = 1$ and the station 22 being located midway between the two end stations, other and different shaped contours may be achieved by varying the values of $M$ and $N$ and by varying the position of the station 22. In FIG. 6 for example, halop contours are shown for conditions: $M = 3$ and $N = 1$ with the position of station 22 being midway between stations 20 and 24. These contours are not symmetrical with the station 22 but instead are distorted or bent toward the right in the figure as shown. This capability is of importance in situations wherein a unique shaped channel or port requires that the iso-phase patterns be "shaped" to cover the navigable area thereof. In FIG. 7, similar results are achieved by displacing the station 22 so that it is located a distance from station 20 equal to one-third of the distance between stations 20 and 24.

Figure 5:
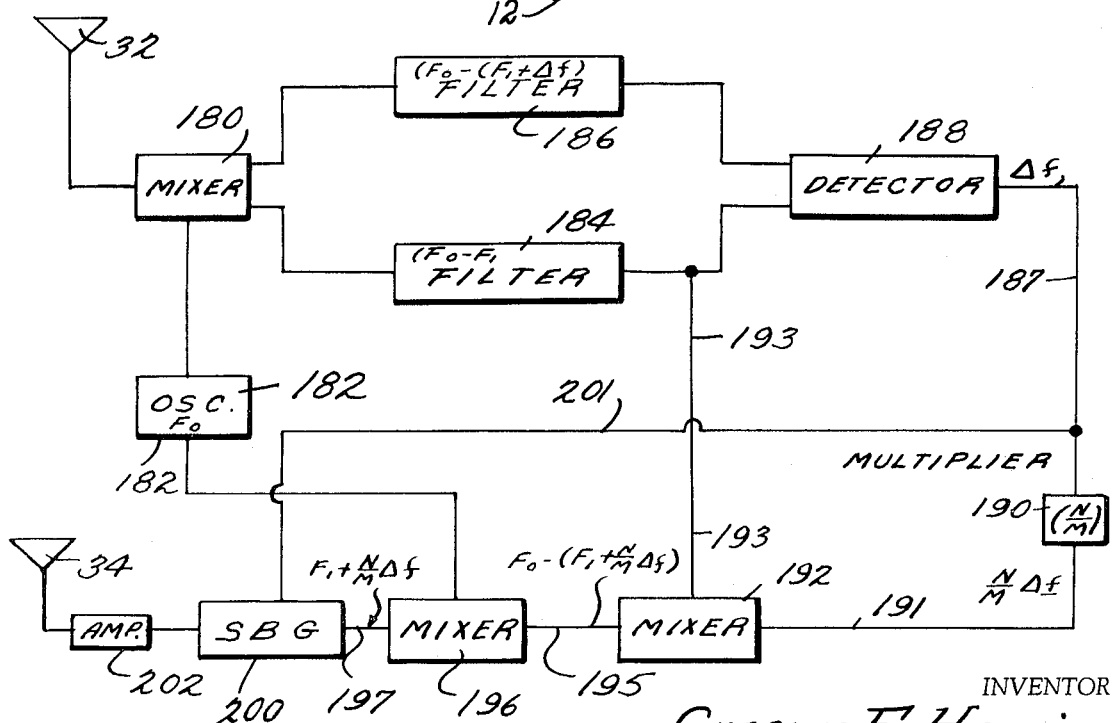
FIG. 5 is another embodiment of the center station frequency control means.

In FIG. 5 there is shown another embodiment of the control means suitable for controlling the phase and frequency of the signals $S_2$ and $S_4$ from station 22. The antenna 32 again receives the various signals including $S_1$ and $S_3$. These signals are mixed in mixer 180 with the signal from local oscillator 182 to produce intermediate frequencies, corresponding to received signals, which can be separated by bandpass filters. The mixer products are connected in parallel through bandpass filters 184 and 186 to a detector 188. Filter 184 is tuned to pass only the mixer product $F_o - F_1$ wherein $F_o$ is the frequency of the local oscillator signals and $F_1$ is the frequency of signal $S_1$. Bandpass filter 186 is tuned to pass only the mixer product $F_o - (F_1 + \Delta f)$ where $F_1 + \Delta f$ is the frequency of signal $S_3$. The output of detector 188 on lead 187 is therefore the frequency difference between $S_1$ and $S_3$, i.e., $\Delta f$, and has a phase dependent upon the phase difference between $S_1$ and $S_3$ as received by antenna 32.

This difference frequency signal is then multiplied in multiplier 190 by the factor $N/M$ to produce a signal having a frequency $(N/M) \Delta f$ and having a phase proportioned to $(N/M) \Delta \phi$. In practice, the element 190 is either a multiplier or divider depending on the relative magnitudes of $N$ and $M$. The signal frequency $(N/M) \Delta f$ is connected via lead 191 to another mixer 192 wherein it is mixed with signal output from filter 184. This signal is connected to mixer 192 by lead 193. Mixer 192 is thereby effective to produce a difference frequency signal on lead 195 having a frequency $F_o - (F_1 + [N/M] \Delta f)$.

The signal on lead 195 is then mixed in mixer 196 with the local oscillator signal $F_o$ produce on lead 197 the difference frequency $F_1 + (N/M) \Delta f$ which is the desired frequency of $S_2$ as hereinbefore explained. By generating the signal $S_2$ in this manner, i.e., by sum and difference combinations of the frequencies of signals $S_1$ and $S_3$ the phase and frequency of the signal $S_2$ are automatically maintained in fixed relation to the phase and frequency of signals $S_1$ and $S_3$ without the feedback arrangement shown in FIG. 3.

The upper sideband reference phase information signal $S_4$ is readily obtained by connecting the signal $\Delta f$ on lead 187 to the modulation input of the single sideband generator 200 by the lead 201. The combined signals are then amplified in RF amplifier 202 and radiated from transmitting antenna 34.

It should be clear from the foregoing disclosure that the various elements of this invention are subject to change and modification by those skilled in the art, and that the detailed description of various preferred embodiments is not intended to limit the scope of this invention.

For example, in both embodiments, shown, the phase reference signal $\Delta f$ which indicates the relative phases of $S_1$ and $S_3$ as broadcast is modulated onto $S_2$ by a single side band generator. This information in $\Delta f$ could be broadcast in any manner, such as by amplitude modulating it onto $S_2$, by modulating it onto $S_1$ or $S_3$, or by broadcasting it on an independent carrier.

Similarly, the application of this invention is not limited to the conventional use of position determination for water going vessels with respect to land based transmitters. On the contrary, the apparatus of the present invention is of general applicability to situations wherein knowledge of the position of a receiver is desired. It may further be used in combination with other navigational systems, including saturable type systems to provide lane identification capability. The invention may further be usefully employed as an instrument landing system for helicopters and other aircraft. In helicopter landing applications, a helicopeter equipped with receiver apparatus of the present invention would follow a hyperbolic contour, which assuming rather small separation between the end stations, would pass through the landing zone. In this manner the operator of the helicopter would merely count the revolutions of the halop phase meter to determine his position or distance from the landing point.

Thus, it is to be understood that the foregoing description of a preferred embodiment of the present invention is not intended to limit the scope thereof which is to be determined only by reference to the following claims.

We claim:

1. A system for determining the position of a mobile receiver with respect to known locations comprising, in combination:
    a. first, second and third radio transmitters each located at a respective predetermined location,
    b. means for generating and transmitting from said first transmitter a first radio signal having a predetermined frequency $F_1$,
    c. means for generating and transmitting from said third transmitter a third radio signal having a predetermined frequency $F_1 + \Delta f$,
    d. means for generating and transmitting from said second transmitter a second radio signal having a predetermined frequency $F_1 + (N/M) \Delta f$, where $N$ and $M$ are integers, and
    e. a mobile receiver comprising,
        1. means for heterodying said first and second radio signals to produce a fourth signal,
        2. means for heterodying said first and third radio signals to produce a fifth signal,
        3. means for equalizing the frequencies of said fourth and fifth signals, and
        4. first phase comparing means for comparing the phases of said frequency equalized fourth and fifth signals to provide a halop position indication, the phase difference between said frequency equalized fourth and fifth signals being zero for all points defined the general relationship $K_1, K_2, K_3 \ldots K_n = C - M/N)B = A(8M/N$ 1) where $K_1 K_2 K_3 \ldots K_n$ are constants and $A, B,$ and $C$ are the distances from any one of said points to said first, second and third transmitters, respectively, and
    f. hyperbolic position indicating means for comparing the relative phases of two of said radio signals as received at said mobile receiver with the relative phases of said two radio signals as transmitted by their respective transmitters to provide a hyperbolic position indication.

2. The system of claim 1 which further comprises:
    a. means for generating and transmitting a reference phase signal which is indicative of the relative phase of said two radio signals as transmitted by their respective transmitters, and
    b. second phase comparing means in said hyperbolic position indicating means at said mobile receiver for comparing the relative phases of said two radio signals as received at said mobile receiver with said reference phase signal to provide a hyperbolic position indication.

3. The system of claim 2 in which said two radio signals are said first and third radio signals and in which said second phase comparing means compares said fifth signal with said reference phase signal to provide a hyperbolic position indication.

4. The system of claim 3 in which said reference phase signal is modulated onto said second radio signal and transmitted from said second transmitter.

5. The system of claim 1 in which said means for generating said second radio signal includes control means responsive to said first and third radio signals for controlling the frequency of said second radio signal at the value $F_1 + (N/M) \Delta f$.

6. The system of claim 5 in which said control means comprises:
    a. means for receiving said first, second and third radio signals at said second radio transmitter,
    b. means for deriving a first beat frequency signal from said first and second radio signals,
    c. means for deriving a second beat frequency signal from said second and third radio signals, d. means for equalizing the frequencies of said first and second beat signals, and
e. means responsive to the phase difference in the frequency equalized beat signals for controlling the frequency and phase of said second radio signal such that said phase difference in said frequency equalized beat signals is zero.

7. The system of claim 6 in which said means for equalizing the frequencies of said first and second beat signals comprises first multiplier means for multiplying the frequency of said first beat signal by the factor ($M - N$) and second multiplier means for multiplying the frequency of said second beat signal by the factor $N$.

8. The system of claim 1 in which said second radio transmitter is located substantially along the straight line between said first and third radio transmitters.

9. The system of claim 4 in which the frequency of said second radio signal is maintained at the value $F_1 + (N/M) \Delta f$ by control means comprising:

a. means for receiving said first, second and third radio signals at said second radio transmitter,
b. means for deriving a first beat frequency signal from said first and second radio signals,
c. means for deriving a second beat frequency signal, from said second and third radio signals,
d. means for equalizing the frequencies of said first and second beat signals by multiplying said first beat signal by the factor ($M - N$) and by multiplying said second beat signal by the factor N, and
e. means responsive to the phase difference in the frequency equalized beat signals for controlling the frequency and phase of said second radio signal such that said phase difference in said freqeuncy equalized beat signals is zero.

10. The system of claim 9 in which $N = 1$, $M = 2$ and $\Delta f$ is an audio frequency.

* * * * *